United States Patent
Gombert

(10) Patent No.: US 8,909,417 B2
(45) Date of Patent: Dec. 9, 2014

(54) MONITORING SYSTEM FOR TRACKBOUND GOODS OR PASSENGERS TRANSPORTED IN A RAILCAR

(75) Inventor: Bernd Gombert, Seefeld (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 14 days.

(21) Appl. No.: 13/809,492

(22) PCT Filed: Jul. 12, 2011

(86) PCT No.: PCT/EP2011/061790
§ 371 (c)(1),
(2), (4) Date: Jan. 10, 2013

(87) PCT Pub. No.: WO2012/007439
PCT Pub. Date: Jan. 19, 2012

(65) Prior Publication Data
US 2013/0103255 A1 Apr. 25, 2013

(30) Foreign Application Priority Data
Jul. 16, 2010 (DE) .......................... 10 2010 027 491

(51) Int. Cl.
| | | |
|---|---|---|
| *G06F 17/00* | (2006.01) | |
| *B61L 27/00* | (2006.01) | |
| *G06Q 50/30* | (2012.01) | |
| *B61L 15/00* | (2006.01) | |
| *B61L 25/02* | (2006.01) | |
| *B61D 43/00* | (2006.01) | |
| *H04Q 9/00* | (2006.01) | |
| *B61F 15/20* | (2006.01) | |

(52) U.S. Cl.
CPC ............. *G06F 17/00* (2013.01); *B61L 27/0094* (2013.01); *H04Q 2209/886* (2013.01); *G06Q 50/30* (2013.01); *B61L 15/0081* (2013.01); *B61L 2205/02* (2013.01); *Y02T 30/36* (2013.01); *B61L 25/025* (2013.01); *B61D 43/00* (2013.01); *H04Q 2209/40* (2013.01); *H04Q 9/00* (2013.01); *H04Q 2209/823* (2013.01); *B61L 2205/04* (2013.01); *B61F 15/20* (2013.01); *B61L 15/0027* (2013.01)
USPC .............................. 701/34.4; 701/1; 701/29.1

(58) Field of Classification Search
CPC ......... G06F 17/00; B61D 43/00; B61F 15/00; B61F 15/0081
USPC ............................................ 701/34.4, 1, 29.1
See application file for complete search history.

(56) References Cited

U.S. PATENT DOCUMENTS

| | | | | |
|---|---|---|---|---|
| 2003/0214417 | A1* | 11/2003 | Peltz et al. ..................... | 340/825 |
| 2007/0208841 | A1* | 9/2007 | Barone et al. .................. | 709/223 |

FOREIGN PATENT DOCUMENTS

| | | | | |
|---|---|---|---|---|
| AT | 507 3802 | A1 * | 4/2010 | |
| AT | 507382 | | 4/2010 | |
| WO | 2008014766 | | 2/2008 | |
| WO | 2010012277 | | 2/2010 | |
| WO | WO 2010/012277 | * | 4/2010 | ............. F16C 19/52 |

* cited by examiner

*Primary Examiner* — Mary Cheung
*Assistant Examiner* — Brian P Sweeney
(74) *Attorney, Agent, or Firm* — Volpe and Koenig, P.C.

(57) ABSTRACT

A monitoring system for rail-borne transportation of goods or people in at least one car. The one or more cars may, for example, be railway cars or tram cars which are moved in the public rail system. The monitoring system according to the invention first of all includes a generator mount, which is integrated in at least one wheel bearing of the car. The generator mount is therefore used on the one hand as the bearing for a wheel of the car, and on the other hand to produce electrical energy, as a result of which it forms a power supply unit. The components which are required to produce the electrical voltage in the generator mount are integrated in the mount. One of these components is formed by a conductor arrangement which is used for induction of an electrical voltage to be generated. The monitoring system according to the invention furthermore includes sensor electronics, which are electrically connected to the conductor arrangement, for determining measurement variables which act on the conductor arrangement. As a result, the generator mount furthermore forms a sensor.

10 Claims, No Drawings

MONITORING SYSTEM FOR TRACKBOUND GOODS OR PASSENGERS TRANSPORTED IN A RAILCAR

FIELD OF THE INVENTION

The present invention relates to a monitoring system for rail-borne transportation of goods or people in at least one car. By way of example, the one or more cars may be railroad cars or streetcars which are moved on the public rail network. They may be cars in goods or passenger traffic or else in local public transport.

AT 507 382 A1 shows a wheelset bearing housing with a position detection device for rail vehicles. The position detection device has a satellite-based position detection receiver and is powered by an electrical generator, which is preferably in the form of a bearingless hub generator, with the result that a generator bearing is formed.

WO 2008/014766 A1 shows an apparatus for monitoring at least one operating variable for a wheelset bearing in a rail vehicle. The wheelset bearing comprises at least one rotating bearing ring and a static wheelset bearing housing. A sensor is arranged directly on the rotating bearing ring. A transmission unit rotating with the bearing ring transmits the measured values delivered by the sensor wirelessly to a static reception device. The sensor and the transmission unit are supplied with power by a power supply unit which comprises a first concomitantly rotating generator element and a second generator element, which cooperates with the latter and is arranged on the wheelset bearing housing. The wheelset bearing is thus simultaneously in the form of an electrical generator and is therefore a generator bearing.

WO 2010/012277 A1 discloses a roller bearing having a magnet device which has at least one magnetic flux guiding device mounted on a bearing element. The flux guiding device has at least one pole piece ending in the region of the path of movement of the roll body. At least one roll body is of magnetically active and/or conductive design. The magnetic flux guiding device has one or more electrical windings for inductive voltage generation. Hence, the roller bearing has an electrical generator and is a generator bearing. The electrical voltage that can be generated can be used to supply power to sensors on the wheel bearing, for example.

An as yet unpublished patent application shows a bearing having a power generation unit, which bearing has a first and a second claw ring mounted on a first bearing ring. The two claw rings have a magnetic induction coil arranged between them. Each of the two claw rings is arranged in a magnetically conductive connection to a section of the body of the first bearing ring, with the magnetic loop essentially being closed via the section of the body of the first bearing ring. The bearing shown with the power generation unit is a generator bearing.

An as yet unpublished patent application shows a bearing having a power generation unit, which bearing has a claw ring mounted on a first bearing ring, while a second bearing ring has a circumferential sequence of magnetic pole pairs. An induction coil is situated in a circumferential magnetic loop which is closed via magnetic poles of the pole pairs and via claws of the claw ring. The claws of the claw ring are arranged in a magnetically conductive connection to a magnetically conductive section of the body of the first bearing ring. The magnetic poles of the pole pairs are arranged in a magnetically conductive connection to a magnetically conductive section of the body of the second bearing ring. The magnetic loop is closed via the magnetic sections and the roll bodies. The bearing shown for the power generation unit is a generator bearing.

The as yet unpublished patent application DE 10 2010 009 633.4 shows a communication system for the rail-borne transportation of goods or people in a car. The communication system comprises a central superordinate control computer. In addition, the communication system comprises a power supply unit, an energy store and an onboard unit, which are associated with each car separately. The onboard unit is designed to receive internal and satellite-based data, to process them and to send them to the control computer via a transmission unit. The power supply unit is preferably in the form of a generator bearing.

Against the background of the prior art, the object of the present invention is to provide a monitoring system for rail-borne transportation of goods or people in a car, which system allows integrated monitoring of diverse variables and is therefore suitable for incorporation into logistical and safety systems in order to be able to control complex logistical processes and to ensure the safety of the transportation.

SUMMARY

The cited object is achieved by a monitoring system according to the invention.

The monitoring system according to the invention is used for monitoring rail-borne transportation of goods or people which is effected using at least one car. The monitoring system is preferably designed for monitoring a plurality of cars, particularly also a plurality of trains. In the simplest case, the monitoring system according to the invention is provided for just one car and is arranged exclusively in or on this car. The monitoring system according to the invention firstly comprises a generator bearing which is integrated in at least one wheel bearing of the car. The generator bearing is therefore used firstly for mounting a wheel of the car and secondly for generating electrical power, with the result that it also forms a power supply unit. The generator bearing is preferably in the form of a roller bearing. In the case of the generator bearing, the components which are required for generating the electrical voltage are integrated in the bearing, for example in a bearing interior of the roller bearing. One of these components is formed by a conductor arrangement, which is used for inducing an electrical voltage that is to be generated. The conductor arrangement is preferably a winding or a coil. Further components are formed by permanent magnets and/or electromagnets, for example. When the generator bearing rotates, the permanent magnet and the electromagnet result in an electrical voltage being induced in the conductor arrangement. The monitoring system according to the invention furthermore comprises a sensor electronics unit, which is electrically connected to the conductor arrangement, for determining measured variables which influence the conductor arrangement. Therefore, the generator bearing also forms a sensor. The conductor arrangement of the generator bearing is thus used to generate an electrical voltage which is used firstly for supplying electrical power and secondly for measuring measured variables which influence the conductor arrangement. The measured variables are particularly measured variables which become measurable by virtue of the influence of the other components of the generator bearing that are necessary for generating the electrical voltage, particularly the permanent magnets and/or the electromagnets. By way of example, an electrical voltage is produced in the conductor arrangement, the time profile of said electrical voltage being dependent on the rotation speed of the generator bearing. However, this voltage is also dependent on further variables, for example on a particular mechanical loading of the generator bearing, the effect of which is an altered air gap in relation to the conductor arrangement. It is also possible to draw conclusions about the time profile of the mechanical loading, for example whether a jolt or a vibration is involved. It is also possible to draw conclusions about the location and orientation of the mechanical loading, for example whether a load is introduced coaxially or eccentrically. In particular, it is conceivable to determine natural vibrations and/or rolling moments of the car in order to obtain conclusions therefrom as to the state of the cargo being conveyed by the car, e.g. containers, (liquid) tanks, piece goods, bulk goods or the like. By way of example, it is thus possible to identify a leak from a liquid tank by virtue of a temporal alteration in natural vibrations or rolling moments and to forward said leak detection to a control computer, which is an added value in terms of safety particularly when dangerous goods are being transported. If the cargo comprises physical articles (e.g. piece goods or bulk goods), this also allows a shift in the cargo to be identified by the very same temporal alteration in natural vibrations or rolling moments.

A particular advantage of the monitoring system according to the invention is that the wheel bearing of the monitoring system incorporates three functions, namely an original function as a wheel bearing, a function as a generator for generating an electrical supply voltage and a function as a sensor for measuring measured variables which influence the bearing and allow the car to be monitored. The bearing can therefore be called a generator sensor bearing.

In one preferred embodiment of the monitoring system according to the invention, the system also comprises a central superordinate control computer. The control computer is preferably arranged at a location from which a plurality of cars are monitored, for example in a control center. In contrast to the generator bearing, the control computer is therefore not situated on or in the car. Furthermore, this embodiment of the monitoring system according to the invention comprises at least one onboard unit which is associated with each car separately together with the power supply unit. Therefore, each car which needs to be monitored using the monitoring system has a power supply unit in the form of the generator bearing, the sensor electronics unit and the onboard unit. The onboard unit is used to receive internal and satellite-based data, to process them and to send them to the control computer via a transmission unit. In this embodiment of the monitoring system according to the invention, it is possible to monitor a multiplicity of the cars in order to be able to perform complex logistical processes. In this case, the monitoring system can be used both by the operator of the rail network and of the cars and by a customer who is using the transport services. The operator of the rail system and/or of the cars can simultaneously use the monitoring system according to the invention to ensure the safety of the rail system or of the cars. The central control computer allows continuous monitoring, which requires only a small amount of human work even with a large number of cars. In this embodiment of the monitoring system according to the invention, the cars can be localized using the satellite-based data received from the onboard unit, for example by using the GPS. It is therefore also possible to use the data received on the control computer which is sent by the cars for monitoring the location and the movement of the car.

Preferably, the onboard unit comprises a reception unit for receiving internal or state-related data from the control computer or from an internal system. The reception unit allows bidirectional communication between the onboard units of the cars and the control computer.

The transmission unit and/or the reception unit is preferably formed by a mobile radio unit. The mobile radio unit is preferably configured for encrypted data interchange via GSM or via UMTS.

The sensor electronics unit is preferably supplied with electricity directly or indirectly by the generator of the generator bearing. In order to allow a supply of power for the sensor electronics unit to be ensured even when the generator bearing is not generating an electrical supply voltage, the monitoring system preferably also comprises an electrical energy store that is formed in the power supply unit, for example a storage battery or a capacitor. In this case, the monitoring system may be configured such that the electrical energy store is charged by the generator of the generator bearing.

The electrical voltage induced in the conductor arrangement is dependent on the form of an air gap between the conductor arrangement and a magnetic or electromagnetic component interacting with the conductor arrangement, for example between the conductor arrangement in the form of a coil and a permanent magnet. Mechanical loadings or else wear result in the air gap changing. In order to be able to measure such influences, the sensor electronics unit is preferably configured so as to measure measured variables which are dependent upon a change in the air gap between the conductor arrangement and the magnetic or electromagnetic component interacting with the conductor arrangement. Alternatively or in addition, the sensor electronics unit is preferably configured to determine a rotation speed between the conductor arrangement and the magnetic or electromagnetic component interacting with the conductor arrangement. The rotation speed between the conductor arrangement and the magnetic or electromagnetic component interacting with the conductor arrangement is in most cases the same as a rotation speed of the wheel bearing and hence the same as the rotation speed of the mounted wheel on the car. Therefore, this embodiment of the monitoring system according to the invention allows the rotation speed of the mounted wheel on the car to be measured and therefore also the path, speed and acceleration of the car to be determined. It is also possible to draw conclusions about the wear on the car.

In one particularly preferred embodiment of the monitoring system according to the invention, the sensor electronics unit is designed to determine a distance covered by the car on the basis of the measured variables that are measured which influence the conductor arrangement. To this end, in the simplest case, the sensor electronics unit is designed to measure the rotation speed of the wheel bearing, from which it is possible to determine the distance covered. In addition, this embodiment of the monitoring system according to the invention comprises a satellite-based measurement system for determining the distance covered by the car, for example a measurement system on the basis of GPS. The distance ascertained by the sensor electronics unit and the distance ascertained by the satellite-based measurement system can be compared with one another, wherein the difference ascertained in this comparison represents a difference section which can be termed slippage between the mounted wheel and the traversed rail. This slippage is dependent on the load which influences the car and is an important measure of the deterioration which occurs at the contact between the wheels on the car and the rail in the rail network. On the basis of constant determination of the location of the cars using the satellite-based measurement system, it is possible to localize the wear in the rail network. Similarly, it is possible to infer the wear on the wheels of the car. The data which can be ascertained in this manner firstly allow conclusions as to the safety which can be afforded and secondly allow statements to be made about the requisite maintenance and servicing. The slippage between the mounted wheel and the traversed rail can preferably be determined centrally, for which purpose the control computer needs to be provided with an appropriate design.

In a further particularly preferred embodiment of the monitoring system according to the invention, the wheel bearing contains further sensors for determining accelerations, forces, moments and/or temperatures. By way of examples, these sensors are formed by optoelectronic sensors and/or Hall sensors. Using the further sensors and the generator bearing acting as a sensor, it is possible to make statements about a multiplicity of safety-related events on the car. By way of example, it is possible to detect alterations in the generator bearing on account of deterioration, for example as a result of a loss of initial tension, on account of pitting as a result of uneven running, on account of noise or else on account of further events, such as blows and impacts at the contact between the mounted wheel and the rail. This multiplicity of detectable variables and events allows a statement about the life and availability of the monitored car and the traversed rail. By way of example, it is possible to identify joint distortions in the monitored rail. It is also possible to identify deteriorations on a wheel tire on the mounted wheel before said tire bursts or tears. The measured data and the identified events can be compared or else combined with reference data, for example from a further instance of the generator bearings on the car or else from a generator bearing on an adjacent car, for example in order to be able to predict the life of components of the car or of the rail network, such as a set of points. This embodiment of the monitoring system according to the invention is suitable for detecting all the essential variables at the contact between the mounted wheel and the rail, including various forces and torques which are introduced and transmitted by a chassis or by individual axles on the car and the bogies thereof. The variables measured and events identified, such as vibrations, impacts, accelerations and/or forces which act on the system formed by the cars and the rail network, can be assessed using a driving-dynamics model in order to determine the actual behavior of the cars or train having a plurality of the cars, which allows possible misbehavior to be considered and observed, for example. In particular, it is conceivable to determine natural vibrations and/or rolling moments of the car in order to obtain conclusions therefrom as to the state of the cargo being conveyed by the car, e.g. containers, (liquid) tanks, piece goods, bulk goods or the like. By way of example, it is thus possible to identify a leak from a liquid tank by virtue of a temporal alteration in natural vibrations or rolling moments and to forward said leak detection to a control computer, which is an added value in terms of safety particularly when dangerous goods are being transported. If the cargo comprises physical articles, this also allows a shift in the cargo to be identified by this temporal alteration in natural vibrations or rolling moments. The variables measured and events identified can also be used to influence the monitored car or the train with the monitored cars, particularly by increasing or reducing the speed of the car or the train by means of regulation or control.

In a further preferred embodiment of the monitoring system according to the invention, the generator bearing and the sensor electronics unit are arranged together in a housing which also contains a sensor for identifying when the housing is opened. Preferably, the generator sensor bearing is situated completely in the housing. The sensor for identifying when the housing is opened is used particularly for identifying and reporting an authorized opening of the housing. In this case, the sensor for identifying when the housing is opened is preferably formed by an optoelectronic sensor which is simultaneously used for measuring a rotation speed of the generator bearing. The sensor for identifying when the housing is opened may also be formed by contact sensors, magnet sensors or other sensors, however. The housing is also preferably equipped with an intrusion protection mechanism.

The generator bearing, the sensor electronics unit and a measurement data memory are preferably arranged together in a housing in order to form a black box. In a possible catastrophe situation, the black box is used to allow reconstruction of the measurement data and identified events measured by the monitoring system according to the invention.

In further preferred embodiments of the monitoring system according to the invention, said system is also designed to determine the wear on a component of the car on the basis of the measured values that are measured. The wearing component may be formed by a brake, by a bearing or by a wheel tire on the car, for example. By way of example, the wear on a brake can be ascertained by recording and assessing the variables measured for the movement of the car over the running time. To this end, the measured variables for the movement which are ascertained by the sensor electronics unit preferably need to be compared with the measured variables for the movement which are ascertained by the satellite-based measurement system. From this, it is possible to infer what decelerations have been brought about by the brakes, inter alia. In this case, the monitoring system according to the invention is preferably configured such that the ascertained wear is transmitted to the control computer. If the wear exceeds an admissible measure, an alarm can be output.

In one preferred embodiment of the monitoring system according to the invention, the control computer also comprises a logistics management system. The logistics management system can be used to plan and organize the processes on the rail network. It is possible to perform coordination, monitoring and optimization of the entire flow of traffic and goods, for example minimization of standstill times, and also process analysis and timetable and network optimization. Using the localizability of the cars which is provided in one preferred embodiment of the monitoring system according to the invention, it is possible to use the control computer to identify whether a particular car is available and what state it is in. In the same way, it is possible to perform tracking, i.e. following and requesting the current position of the cars, this being used to calculate a toll on a toll route, for example.

The control computer preferably comprises an information portal which provides all the relevant data for each car in an intranet or on the Internet, for example for logistics, line, toll and/or diagnosis management.

The invention claimed is:

1. A monitoring system for rail-borne transportation of goods or people in a car, comprising:
   a generator bearing which forms a power supply unit, is integrated in at least one wheel bearing of the car and has a conductor arrangement to generate an electrical voltage; and
   a sensor electronics unit, electrically connected to the conductor arrangement, for determining measured variables which influence the conductor arrangement.

2. The monitoring system as claimed in claim 1, further comprising a central superordinate control computer and an onboard unit; wherein the onboard unit is associated with each of the cars separately together with the power supply unit; and the onboard unit receives internal and satellite-based data, processes said data and sends the data to the control computer via a transmission unit.

3. The monitoring system as claimed in claim 1, further comprising an electrical energy store formed in the power supply unit.

4. The monitoring system as claimed in claim 1, wherein the sensor electronics unit is configured to determine a rotation speed between the conductor arrangement and a magnetic or electromagnetic component interacting with the conductor arrangement.

5. The monitoring system as claimed in claim 1, wherein the wheel bearing contains further sensors for determining at least one of accelerations, forces, moments or temperatures.

6. The monitoring system as claimed in claim 1, wherein the generator bearing and the sensor electronics unit are arranged together in a housing which also contains a sensor for identifying when the housing is opened.

7. The monitoring system as claimed in claim 1, wherein the generator bearing, the sensor electronics unit and a measurement data memory are arranged together in a housing in order to form a black box.

8. The monitoring system as claimed in claim 1, wherein the system is configured to determine wear on a component of the car on a basis of the measured values that are measured.

9. The monitoring system as claimed in claim 8, wherein the system is configured to determine wear on a brake on the car on a basis of the measured values that are measured which describe the movement of the car.

10. A monitoring system for rail-borne transportation of goods or people in a cart comprising:
  a generator bearing which forms a power supply unit, is integrated in at least one wheel bearing of the car and has a conductor arrangement to generate an electrical voltage;
  a sensor electronics unit, electrically connected to the conductor arrangement, for determining measured variables which influence the conductor arrangement;
  a satellite-based measurement system for determining the distance covered by the car; and a control computer, wherein the sensor electronics unit is configured to determine a distance covered by the car on a basis of the measured variables that are measured which influence the conductor arrangement, and the control computer is configured to make a comparison of the distance ascertained by the sensor electronics unit with the distance ascertained by the satellite-based measurement system so that the comparison can be used to determine a slippage between the mounted wheel and the rail being traversed.

* * * * *